United States Patent
Liu

(10) Patent No.: US 9,823,722 B2
(45) Date of Patent: Nov. 21, 2017

(54) METHOD, APPARATUS AND SYSTEM FOR ADJUSTING VOLTAGE OF SUPERCAPACITOR

(71) Applicant: Huawei Technologies Co., Ltd., Shenzhen (CN)

(72) Inventor: Weijian Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 11 days.

(21) Appl. No.: 14/622,122

(22) Filed: Feb. 13, 2015

(65) Prior Publication Data

US 2015/0253831 A1    Sep. 10, 2015

(30) Foreign Application Priority Data

Mar. 6, 2014    (CN) .......................... 2014 1 0081221

(51) Int. Cl.
*G06F 1/30* (2006.01)
*G06F 13/42* (2006.01)
(Continued)

(52) U.S. Cl.
CPC ................ *G06F 1/30* (2013.01); *G06F 1/32* (2013.01); *G06F 1/3221* (2013.01); *G06F 1/3275* (2013.01); *G06F 12/0871* (2013.01); *G06F 13/4221* (2013.01); *G11B 19/047* (2013.01); *H02J 7/007* (2013.01); *G06F 2212/6042* (2013.01); *G11B 19/2081* (2013.01); *H02J 7/0075* (2013.01); *Y02B 60/1228* (2013.01); *Y02B 60/1246* (2013.01); *Y02B 60/32* (2013.01)

(58) Field of Classification Search
CPC .... G06F 12/0871; G06F 13/4221; G06F 1/30; G06F 1/32; G06F 1/3221; G06F 1/3275; G06F 2212/6042; G11B 19/047; G11B 19/2081; H02J 7/007; H02J 7/0075
See application file for complete search history.

(56) References Cited

U.S. PATENT DOCUMENTS

2003/0163649 A1*  8/2003  Kapur ................ G06F 12/0813
                                                    711/146
2007/0033431 A1*  2/2007  Pecone ..................... G06F 1/28
                                                    714/6.12
(Continued)

FOREIGN PATENT DOCUMENTS

| CN | 101203825 A | 6/2008 |
|----|-------------|--------|
| CN | 202013570 U | 10/2011 |
| CN | 102376369 A | 3/2012 |

OTHER PUBLICATIONS

Jiang, "Computer assembly and maintenance," (Jun. 30, 2013).

*Primary Examiner* — Thomas Lee
*Assistant Examiner* — Chad Erdman
(74) *Attorney, Agent, or Firm* — Leydig, Voit & Mayer, Ltd.

(57) ABSTRACT

A method for adjusting a voltage of a supercapacitor is disclosed, the method, which is used to retard aging of the supercapacitor and extend a service life of the supercapacitor, includes: acquiring information that carries a system service volume; configuring a size of an available capacity value of the Cache according to the information; and adjusting a working voltage of the supercapacitor according to the configured size of the available capacity value of the Cache.

10 Claims, 7 Drawing Sheets

(51) Int. Cl.
*G06F 12/0871* (2016.01)
*G06F 1/32* (2006.01)
*H02J 7/00* (2006.01)
*G11B 19/04* (2006.01)
*G11B 19/20* (2006.01)

(56) References Cited

U.S. PATENT DOCUMENTS

| | | | |
|---|---|---|---|
| 2007/0033433 A1* | 2/2007 | Pecone | G06F 1/305 714/6.13 |
| 2008/0215808 A1* | 9/2008 | Ashmore | G06F 1/3203 711/113 |
| 2010/0332858 A1 | 12/2010 | Trantham et al. | |
| 2012/0159074 A1* | 6/2012 | Sodhi | G06F 12/0895 711/122 |
| 2013/0278224 A1* | 10/2013 | Ofek | H02M 7/219 320/137 |
| 2014/0195658 A1* | 7/2014 | Puttaswamy Naga | G06F 9/45558 709/223 |
| 2015/0026407 A1* | 1/2015 | McLellan | G06F 12/0864 711/128 |

* cited by examiner

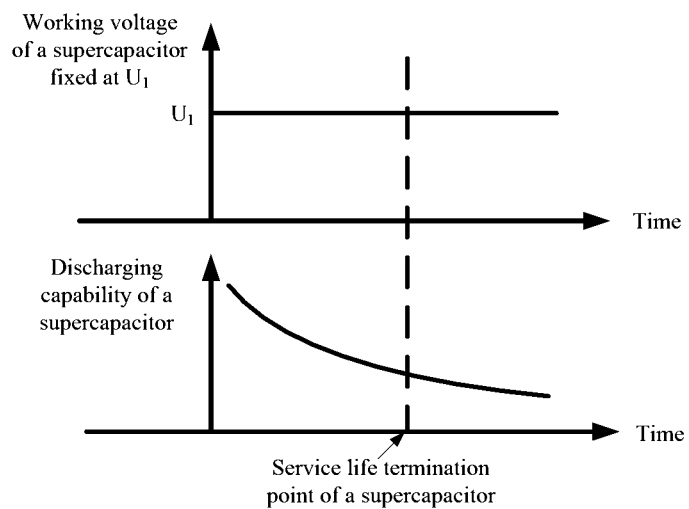
FIG. 1 <Prior Art>
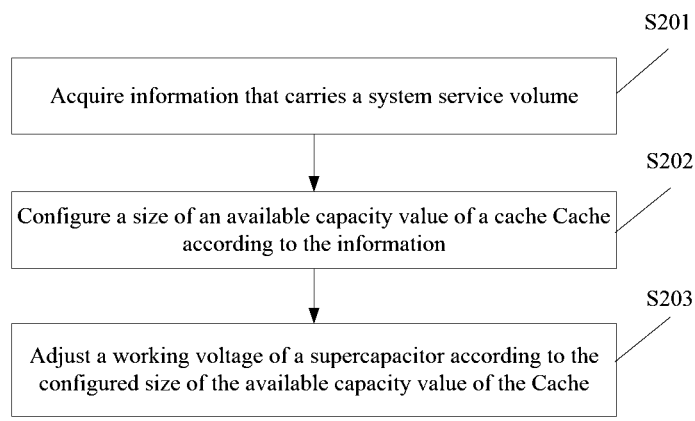
FIG. 2a

METHOD, APPARATUS AND SYSTEM FOR ADJUSTING VOLTAGE OF SUPERCAPACITOR

CROSS-REFERENCE TO RELATED APPLICATION

This application claims priority to Chinese Patent Application No. 201410081221.6, filed on Mar. 6, 2014, which is hereby incorporated by reference in its entirety.

TECHNICAL FIELD

The present invention relates to the field of storage technologies, and in particular, to a method, an apparatus and a system for adjusting a voltage of a supercapacitor.

BACKGROUND

Currently, power failure protection on a disk array (RAID, Redundant Array of Independent Disks)/solid state disk (SSD, Solid-State Disk) card is implemented mainly by using "a Nand flash+a supercapacitor/battery". That is, when a primary power supply fails, the supercapacitor/battery, due to its discharging capability, may serve as a backup battery to supply backup power, and save data in a Cache into the Nand flash or another storage medium on which data loss does not occur in the case of power failure.

For example, it is assumed that a working voltage of the supercapacitor is fixed at a voltage value $U_1$, where the $U_1$ needs to last a power failure protection time when a service volume is maximum. Further referring to FIG. 1, FIG. 1 is a schematic diagram showing comparison of a working voltage of the supercapacitor with a discharging capability of the supercapacitor in an existing solution; as shown in the figure, because voltage stress always exists on the supercapacitor, a service life of the supercapacitor is significantly affected, and a larger working voltage results in faster aging of the supercapacitor.

SUMMARY

Embodiments of the present invention provide a method, an apparatus and a system for adjusting a voltage of a supercapacitor, which are used to retard aging of the supercapacitor and extend a service life of the supercapacitor.

In view of this, a first aspect of the present invention provides a method for adjusting a voltage of a supercapacitor, where the supercapacitor is used to perform power failure protection on a control chip that executes a service, where the control chip includes a Cache, where the method includes:
  acquiring information that carries a system service volume;
  configuring a size of an available capacity value of the Cache according to the information; and
  adjusting a working voltage of the supercapacitor according to the configured size of the available capacity value of the Cache.

In a first possible implementation manner of the first aspect, the information that carries a system service volume is information about an effective traffic volume of a system interface; and
  the configuring a size of an available capacity value of the Cache according to the information includes: when the effective traffic volume increases, configuring the available capacity value of the Cache to a larger value; and when the effective traffic volume decreases, configuring the available capacity value of the Cache to a smaller value.

With reference to the first possible implementation manner, in a second possible implementation manner,
  when it is determined that the effective traffic volume of the system interface meets a preset traffic volume range within a preset time period, according to a correspondence between a preset traffic volume range and a size of an available capacity value of the Cache, a size of an available capacity value of the Cache within a next preset time period is configured to a capacity value corresponding to the preset traffic volume range.

With reference to the first possible implementation manner, in a third possible implementation manner, before the acquiring information that carries a system service volume, the method includes acquiring the effective traffic volume of the system interface;
  if the control chip is used to execute a disk array RAID service, the control chip is a RAID controller and the system interface is a PCIE interface, the acquiring the effective traffic volume of the system interface is:
  acquiring an effective traffic volume of the PCIE interface; and
  if the control chip is used to execute a solid state disk SSD service, the control chip is an SSD controller and the system interface is a PCIE interface or a SAS/SATA interface, the acquiring the effective traffic volume of the system interface is:
  acquiring an effective traffic volume of the PCIE interface or the SAS/SATA interface.

In a fourth possible implementation manner of the first aspect, the information that carries a system service volume is time information of a system service, where the time information corresponds to the system service volume; and
  the configuring a size of an available capacity value of the Cache according to the information includes:
  according to the time information of the system service, and a preset correspondence between time information of a system service and a size of an available capacity value of the Cache, configuring the current size of the available capacity value of the Cache to a capacity value corresponding to the time information of the system service.

In a fifth possible implementation manner of the first aspect, the adjusting a working voltage of the supercapacitor according to a configured size of the available capacity value of the Cache includes:
  if the available capacity value of the Cache increases, increasing the working voltage of the supercapacitor; and if the available capacity value of the Cache decreases, decreasing the working voltage of the supercapacitor.

With reference to the first aspect or any one of the first to the fifth possible implementation manners of the first aspect, in a sixth possible implementation manner, within a power failure protection time that can be supported by an adjusted working voltage of the supercapacitor, data in the Cache whose available capacity value has been adjusted can be migrated (for example, by a CPU) into another non-volatile storage medium.

A second aspect of the present invention provides an apparatus for adjusting a voltage of a supercapacitor, where the supercapacitor is used to perform power failure protection on a control chip that executes a service, where the control chip includes a Cache, where the apparatus includes:

a monitoring module, configured to acquire information that carries a system service volume;

a configuring module, configured to configure a size of an available capacity value of the Cache according to the information; and an adjusting module, configured to adjust a working voltage of the supercapacitor according to the configured size of the available capacity value of the Cache.

In a first possible implementation manner of the second aspect, the information that carries a system service volume is information about an effective traffic volume of a system interface; and the configuring module is configured to: when the effective traffic volume increases, configure the available capacity value of the Cache to a larger value; and when the effective traffic volume decreases, configure the available capacity value of the Cache to a smaller value.

With reference to the first possible implementation manner, in a second possible implementation manner, the configuring module is specifically configured to: when it is determined that the effective traffic volume of the system interface meets a preset traffic volume range within a preset time period, according to a correspondence between a preset traffic volume range and a size of an available capacity value of the Cache, configure a size of an available capacity value of the Cache within a next preset time period to a capacity value corresponding to the preset traffic volume range.

With reference to the first possible implementation manner, in a third possible implementation manner, the apparatus further includes an acquiring module, where the acquiring module is configured to acquire the effective traffic volume of the system interface;

if the control chip is used to execute a disk array RAID service, the control chip is a RAID controller and the system interface is a PCIE interface, the acquiring module is specifically configured to acquire an effective traffic volume of the PCIE interface; and if the control chip is used to execute a solid state disk SSD service, the control chip is an SSD controller and the system interface is a PCIE interface or a SAS/SATA interface, the acquiring module is specifically configured to acquire an effective traffic volume of the PCIE interface or the SAS/SATA interface.

In a fourth possible implementation manner of the second aspect, the information that carries a system service volume is time information of a system service, where the time information corresponds to the system service volume; and the configuring module is specifically configured to, according to the time information of the system service, and a preset correspondence between time information of a system service and a size of an available capacity value of the Cache, configure the current size of the available capacity value of the Cache to a capacity value corresponding to the time information of the system service.

In a fifth possible implementation manner of the second aspect, the adjusting module is configured to: if the available capacity value of the Cache increases, increase the working voltage of the supercapacitor; and if the available capacity value of the Cache decreases, decrease the working voltage of the supercapacitor.

With reference to the second aspect or any one of the first to the fifth possible implementation manners of the second aspect, in a sixth possible implementation manner, the apparatus further includes a control module, where the control module is configured to, within a power failure protection time that can be supported by an adjusted working voltage of the supercapacitor, enable data in the Cache whose available capacity value has been adjusted to be migrated into another non-volatile storage medium.

A third aspect of the present invention provides a system for adjusting a voltage of a supercapacitor, where the system includes a service main control chip, a supercapacitor management IC, and the supercapacitor; where:

the supercapacitor is used to perform power failure protection on the service main control chip that executes a service, where the service main control chip includes a Cache; and the supercapacitor management IC is configured to: acquire information that carries a system service volume, configure a size of an available capacity value of the Cache according to the information, and adjust a working voltage of the supercapacitor according to the configured size of the available capacity value of the Cache.

In a first possible implementation manner of the third aspect, the information that carries a system service volume is information about an effective traffic volume of a system interface; the supercapacitor management IC is configured to: when the effective traffic volume increases, configure the available capacity value of the Cache to a larger value; and when the effective traffic volume decreases, configure the available capacity value of the Cache to a smaller value.

With reference to the first possible implementation manner, in a second possible implementation manner, that the supercapacitor management IC is specifically configured to configure a size of an available capacity value of the Cache according to the information includes: when it is determined that the effective traffic volume of the system interface meets a preset traffic volume range within a preset time period, according to a correspondence between a preset traffic volume range and a size of an available capacity value of the Cache, configuring a size of an available capacity value of the Cache within a next preset time period to a capacity value corresponding to the preset traffic volume range.

With reference to the first possible implementation manner, in a third possible implementation manner, the supercapacitor management IC is further configured to acquire the effective traffic volume of the system interface;

if the service main control chip is used to execute a disk array RAID service, the service main control chip is a RAID controller and the system interface is a PCIE interface, the acquiring the effective traffic volume of the system interface is acquiring an effective traffic volume of the PCIE interface; and if the service main control chip is used to execute a solid state disk SSD service, the service main control chip is an SSD controller and the system interface is a PCIE interface or a SAS/SATA interface, the acquiring the effective traffic volume of the system interface is acquiring an effective traffic volume of the PCIE interface or the SAS/SATA interface.

In a fourth possible implementation manner of the third aspect, the information that carries a system service volume is time information of a system service, where the time information corresponds to the system service volume; and that the supercapacitor management IC is configured to configure a size of an available capacity value of the Cache according to the information includes: according to the time information of the system service, and a preset correspondence between time information of a system service and a size of an available capacity value of the Cache, configuring the current size of the available capacity value of the Cache to a capacity value corresponding to the time information of the system service.

In a fifth possible implementation manner of the third aspect, the supercapacitor management IC is configured to: if the available capacity value of the Cache increases, increase the working voltage of the supercapacitor; and if the available capacity value of the Cache decreases, decrease the working voltage of the supercapacitor.

With reference to the third aspect or any one of the first to the fifth possible implementation manners of the third aspect, in a sixth possible implementation manner, within a power failure protection time that can be supported by an adjusted working voltage of the supercapacitor, data in the Cache whose available capacity value has been adjusted can be migrated into another non-volatile storage medium.

It can be learned from the foregoing technical solutions that, the method, apparatus, and system for adjusting a voltage of a supercapacitor that are provided in the embodiments of the present invention have the following advantages: according to an actual situation of a current system service, a size of an available capacity value of a Cache is configured, thereby implementing intelligent adjustment of a working voltage of the supercapacitor, retarding aging of the supercapacitor, effectively increasing a service life of the supercapacitor, and improving product competitiveness.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic diagram showing comparison of a working voltage of a supercapacitor with a discharging capability of the supercapacitor in an existing solution;

FIG. 2a is a schematic flowchart of a method for adjusting a voltage of a supercapacitor according to an embodiment of the present invention;

DESCRIPTION OF EMBODIMENTS

Figure 2B:
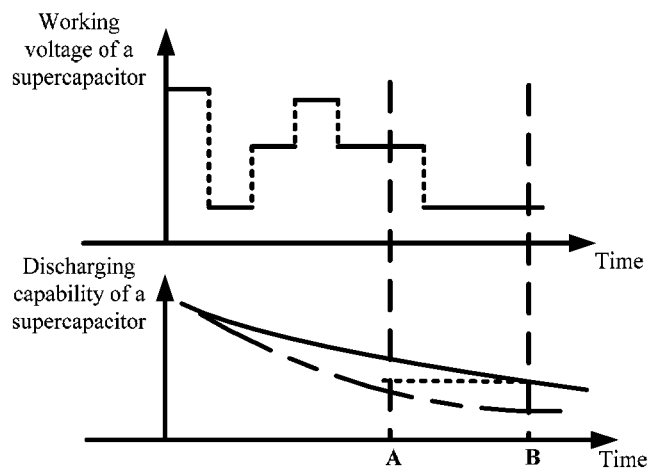
FIG. 2b is a schematic diagram showing comparison of a working voltage of a supercapacitor with a discharging capability of the supercapacitor according to an embodiment of the present invention.

Embodiments of the present invention provide a method, an apparatus and a system for adjusting a voltage of a supercapacitor, which are used to retard aging of the supercapacitor and extend a service life of the supercapacitor.

To make the invention objectives, features, and advantages of the present invention clearer and more comprehensible, the following clearly and completely describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way is interchangeable in proper circumstances so that the embodiments of the present invention described herein can be implemented for example in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The following uses specific embodiments for detailed description respectively.

Referring to FIG. 2a, FIG. 2a is a schematic flowchart of a method for adjusting a voltage of a supercapacitor according to an embodiment of the present invention. The supercapacitor is used to perform power failure protection on a control chip that executes a service, where the control chip includes a Cache. The method for adjusting a voltage may include:

Step S201: Acquire information that carries a system service volume.

Here, the information that carries a system service volume refers to information that can reflect the system service volume, which may be information that directly reflects the system service volume (such as a service volume), or information that indirectly reflects the system service volume (such as time period information corresponding to a service volume).

Step S202: Configure a size of an available capacity value of the Cache according to the information.

If the service volume is not large, the available capacity value of the Cache may be decreased; and if the service volume is large, the available capacity value of the Cache may be increased.

Step S203: Adjust a working voltage of the supercapacitor according to the configured size of the available capacity value of the Cache.

If the available capacity value of the Cache is not large, it indicates that data that needs to be saved after power break is also not large, and that saving time does not need to be long. Therefore, the working voltage of the supercapacitor may be decreased. Because a lower working voltage of the supercapacitor results in a longer service life, after the working voltage of the supercapacitor is decreased, the service life of the supercapacitor may be extended.

Further referring to FIG. 2b, FIG. 2b is a schematic diagram showing comparison of a working voltage of a supercapacitor with a discharging capability of the supercapacitor according to an embodiment of the present invention. In this figure, $1_1$ is a corresponding discharging capability curve when the working voltage of the supercapacitor is fixed at a voltage value $U_1$; $U_1$ needs to last a power failure protection time when a service volume is maximum; a time point A is an original service life termination point of the supercapacitor; $1_2$ is a corresponding discharging capability curve when the supercapacitor works at an intelligently adjusted working voltage; and a time point B is a corresponding service life termination point of the supercapacitor whose working voltage has been intelligently adjusted, where the time point B is later than the time point A. It may be learned from FIG. 3 that after the working voltage of the supercapacitor is intelligently adjusted according to a current service situation, the service life of the supercapacitor is obviously longer than its original service life.

It can be learned from the foregoing description that, in the method for adjusting a voltage of a supercapacitor provided in this embodiment of the present invention, according to an actual situation of a current system service, a size of an available capacity value of a Cache is configured, thereby implementing intelligent adjustment of a working voltage of the supercapacitor, retarding aging of the supercapacitor, effectively increasing a service life of the supercapacitor, and improving product competitiveness.

Preferably, the method for adjusting a voltage of a supercapacitor provided in this embodiment of the present invention may be applied to power failure protection on a RAID/SSD card, to effectively increase the service life of the supercapacitor; when a primary power supply fails, the supercapacitor may serve as a backup battery to supply backup power, and save data in the Cache into a Nand Flash or another storage medium on which data loss does not occur in the case of power failure. It may be understood that, the method for adjusting a voltage of a supercapacitor may also be used in another case in which a supercapacitor is used for power failure protection, which is not specifically limited herein.

Further, in the following embodiments of the present invention, on the basis that the information that carries a system service volume may include information about an effective traffic volume of a system interface and time information of a system service, the method for adjusting a voltage of a supercapacitor is separately analyzed and described.

Figure 3A:
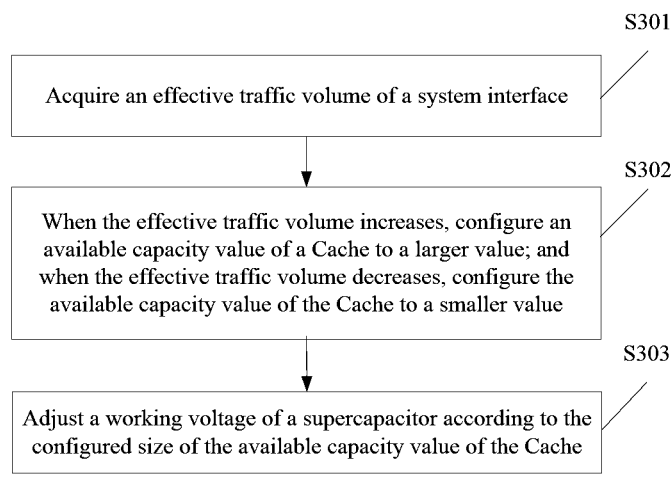
FIG. 3a is another schematic flowchart of a method for adjusting a voltage of a supercapacitor according to an embodiment of the present invention.

Referring to FIG. 3a, FIG. 3a is another schematic flowchart of a method for adjusting a voltage of a supercapacitor according to an embodiment of the present invention. In this embodiment, the method for adjusting a voltage of a supercapacitor is applied to power failure protection on a RAID/SSD card, and information that carries a system service volume is information about an effective traffic volume of a system interface. The method for adjusting a voltage may include:

Step S301: Acquire the effective traffic volume of the system interface.

It may be understood that the system interface refers to an interface between a control chip (such as a RAID/SSD card) and a server board. For example, if the control chip is used to execute a disk array RAID service, the control chip is a RAID controller and the system interface is a PCIE interface; if the control chip is used to execute a solid state disk SSD service, the control chip is an SSD controller and the system interface is a PCIE interface or a SAS/SATA interface.

Further, if the control chip is a RAID controller, the acquiring an effective traffic volume of a system interface is acquiring an effective traffic volume of the PCIE interface; if the control chip is an SSD controller, the acquiring an effective traffic volume of a system interface is acquiring an effective traffic volume of the PCIE interface or SAS/SATA interface. It is easy to figure out that the effective traffic volume of the system interface refers to an actual service volume of interface bandwidth.

Step S302: When the effective traffic volume increases, configure an available capacity value of a Cache to a larger value; when the effective traffic volume decreases, configure the available capacity value of the Cache to a smaller value.

In some implementation manners, when it is determined that the effective traffic volume of the system interface meets a preset traffic volume range within a preset time period, according to a correspondence between a preset traffic volume range and a size of an available capacity value of the Cache, a size of an available capacity value of the Cache within a next preset time period is configured to a capacity value corresponding to the preset traffic volume range.

In this embodiment, if it is determined that the effective traffic volume of the PCIE interface or the effective traffic volume of the SAS/SATA interface meets a preset traffic volume range within a preset time period, according to a correspondence between a preset traffic volume range and a size of an available capacity value of the Cache and according to a size of the preset traffic volume range, a size of an available capacity value of the Cache within a next preset time period is configured to a capacity value corresponding to the preset traffic volume range. If the effective traffic volume of the system interface increases, the available capacity value of the Cache is increased; if the effective traffic volume of the system interface decreases, the available capacity value of the Cache is decreased.

Figure 3B:
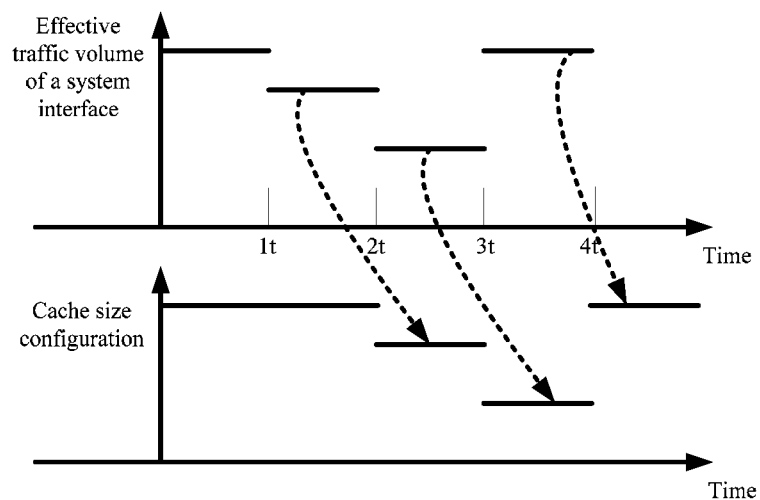
FIG. 3b is a schematic diagram showing comparison of a system service with a Cache capacity according to an embodiment of the present invention.

Further referring to FIG. 3b, FIG. 3b is a schematic diagram showing comparison of a system service with an available capacity value of a Cache according to an embodiment of the present invention. The preset time period is t, and according to the correspondence between a preset traffic volume range and a size of an available capacity value of the Cache, a size of an available capacity value of the Cache within a next preset time period t is configured to a capacity value corresponding to the preset traffic volume range. It may be understood that, when it is determined that an average value of effective traffic volumes within the preset time period t falls within a preset traffic volume range, a size of an available capacity value of the Cache within a next preset time period t is adjusted, that is, according to a size of an effective traffic volume of the system interface within a previous preset time period t, a size of a currently available capacity value of the Cache is adjusted, where an adjusted size of the currently available capacity value of the Cache corresponds to the preset traffic volume range.

It may be understood that, the correspondence between a preset traffic volume range and a size of an available capacity value of the Cache may be preset in a system. In addition, in this embodiment of the present invention, information about correspondence between a preset traffic volume range and a configured size of an available capacity value of the Cache may be further recorded by using an Extensible Markup Language (XML, Extensible Markup Language) configuration file, which is not specifically limited herein.

Step S303: Adjust a working voltage of the supercapacitor according to the configured size of the available capacity value of the Cache.

If the available capacity value of the Cache increases, the working voltage of the supercapacitor is increased; if the available capacity value of the Cache decreases, the working voltage of the supercapacitor is decreased.

It may be understood that, step S303 may specifically include:

Step 1: According to a capacity of the supercapacitor, a discharging cutoff voltage of the supercapacitor, discharging efficiency, a circuit power, and data write bandwidth, calculate a correspondence between a size of an available capacity value of the Cache and a working voltage of the supercapacitor.

Figure 4:
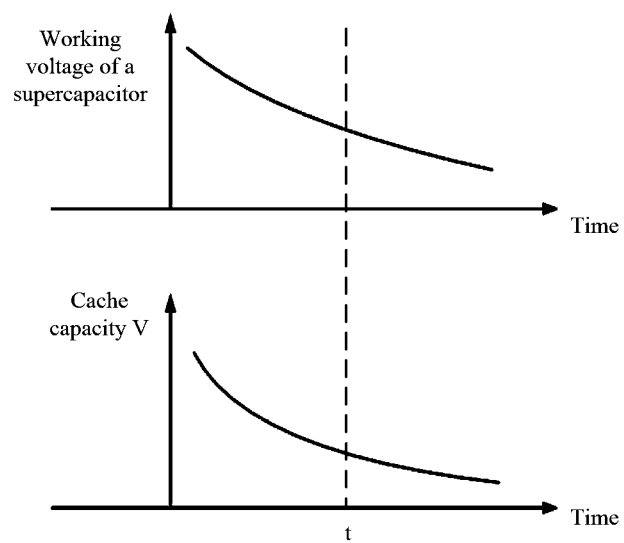
FIG. 4 is a schematic diagram showing comparison of a working voltage of a supercapacitor with a Cache capacity according to an embodiment of the present invention.

A relationship between a size of an available capacity value of the Cache and a working voltage of the supercapacitor may be determined based on the following manner. Referring to FIG. 4, FIG. 4 is a schematic diagram showing comparison of a working voltage of a supercapacitor with a size of an available capacity value of a Cache according to an embodiment of the present invention.

It is assumed that the capacity of the supercapacitor is C, the discharging cutoff voltage of the supercapacitor is $U_1$, the discharging efficiency of the supercapacitor is K, the circuit power is P, and the data write bandwidth is B, where the circuit power P is a power of a circuit after a power supply of the system fails and when the supercapacitor performs discharging. The relationship between an available capacity value V of the Cache and a working voltage $U_2$ of the supercapacitor (that is, a charging voltage of the supercapacitor) may be deduced from the following data formulas: because $0.5*C*(U_2^2-U_1^2)*K=Pt$, it can be deduced that a discharging time of the supercapacitor is $t=0.5*C*(U_2^2-U_1^2)*K/P$, then the relationship between an available capacity value V of the Cache and a working voltage $U_2$ of the supercapacitor is $V=Bt=B*0.5*C*(U_2^2-U_1^2)*K/P$.

It may be understood that the correspondence between a size of an available capacity value of the Cache and a working voltage of the supercapacitor may also be calculated in another manner, and an example here does not impose a limitation on the present invention.

Step 2: According to the configured size of the available capacity value of the Cache, and the correspondence between a size of an available capacity value of the Cache and a working voltage of the supercapacitor, adjust the working voltage of the supercapacitor to a voltage value corresponding to the size of the available capacity value of the Cache.

A voltage adjusting range of the supercapacitor is 0 V-$U_1$, where $U_1$ is a voltage value of writing Cache when a service volume is maximum. According to the configured size of the available capacity value of the Cache in step S303 and the correspondence that is between a size of an available capacity value of the Cache and a working voltage of the supercapacitor and obtained in step 1, a current working voltage of the supercapacitor is adjusted to a voltage value corresponding to the configured size of the available capacity value of the Cache. If the available capacity value of the Cache increases, the working voltage of the supercapacitor is increased; if the available capacity value of the Cache decreases, the working voltage of the supercapacitor is decreased.

It can be learned from the foregoing description that, in the method for adjusting a voltage of a supercapacitor provided in this embodiment of the present invention, a size of an available capacity value of a Cache is configured according to an effective traffic volume of a system interface, thereby implementing intelligent adjustment of a working voltage of the supercapacitor, retarding aging of the supercapacitor, effectively increasing a service life of the supercapacitor, and improving product competitiveness.

Figure 5A:
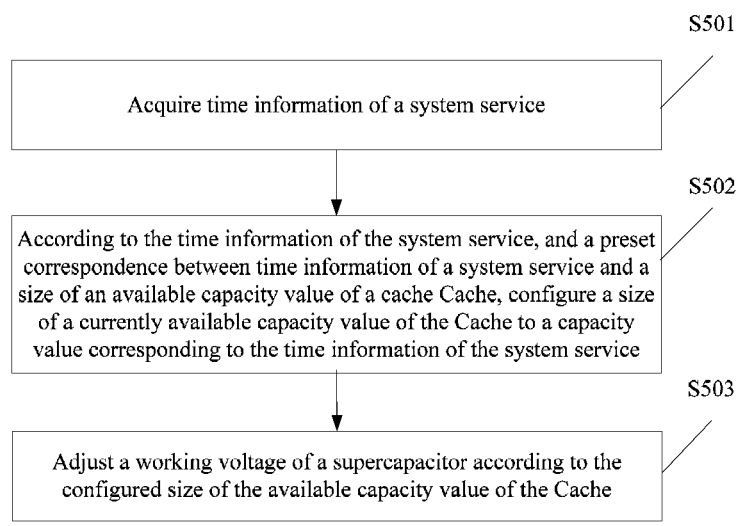
FIG. 5a is another schematic flowchart of a method for adjusting a voltage of a supercapacitor according to an embodiment of the present invention.

Referring to FIG. 5a, FIG. 5a is another schematic flowchart of a method for adjusting a voltage of a supercapacitor according to an embodiment of the present invention. In this embodiment, the method for adjusting a voltage of a supercapacitor is applied to power failure protection on a RAID/SSD card, and information that carries a system service volume is time information of a system service. The method for adjusting a voltage may include:

Step S501: Acquire the time information of the system service, where the time information corresponds to the system service volume.

It may be understood that, the time information of the system service may refer to time period information of the system service in one day. Based on a law of statistics, each time period generally corresponds to its respective system service volume (such as a service volume at night is less than that in daytime). Therefore, by using the foregoing law and based on the time information, an available capacity value and a voltage that are of the Cache may be adjusted. Specifically, information of a day may be divided into four pieces of time period information, one time period from 00:00 to 6:00, one time period from 6:00 to 12:00, one time period from 12:00 to 18:00, and one time period from 18:00 to 24:00. In addition, it is easy to figure out that the time period information listed here is only exemplary description and does not impose a limitation on the present invention. In some cases with high requirements, the time information of the system service in one day may be divided into information of more time periods, such as 6 or 8 time periods, which is not specifically limited herein.

Step S502: According to the time information of the system service, and a preset correspondence between time information of a system service and a size of an available capacity value of a Cache, configure a size of a currently available capacity value of the Cache to a capacity value corresponding to the time information of the system service.

Figure 5B:
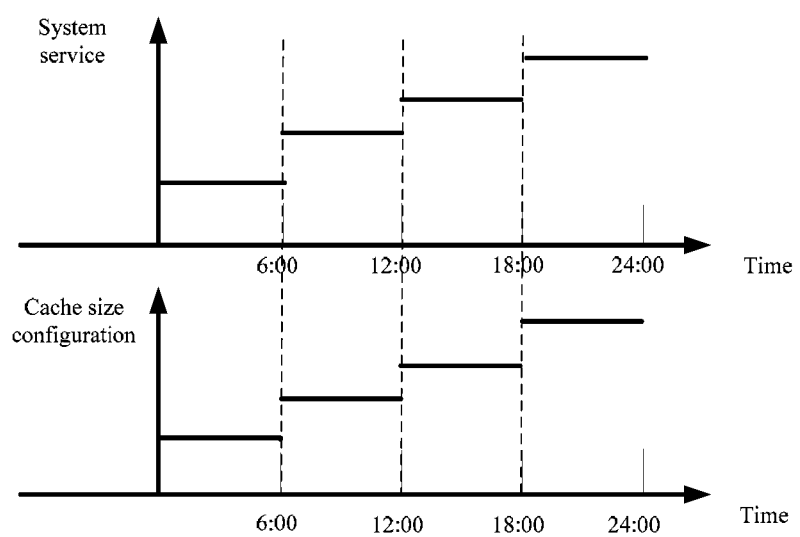
FIG. 5b is another schematic diagram showing comparison of a system service with a Cache capacity according to an embodiment of the present invention.

Further referring to FIG. 5b, FIG. 5b is a schematic diagram showing comparison of a system service with an available capacity value of a Cache according to an embodiment of the present invention. According to currently acquired time information, and the preset correspondence between time information of a system service and a size of an available capacity value of the Cache, the size of an available capacity value of the Cache is configured. For example, as shown in FIG. 5b, time information of a system service in one day is divided into four pieces of time period information in this embodiment, and each time period corresponds to a configured size of the available capacity value of the Cache (it is assumed here that as time passes, a system service volume increases and a corresponding size of a Cache also increases). According to determined current time period information, a size of a currently available capacity value of the Cache is configured to a capacity value corresponding to the current time period information.

It may be understood that, the correspondence between time information of a system service and a size of an available capacity value of the Cache may be preset in a system. In addition, in this embodiment of the present invention, information about correspondence between time information of a system service and a configured size of an available capacity value of the Cache may be further recorded by using an Extensible Markup Language XML configuration file, which is not specifically limited herein.

Step S503: Adjust a working voltage of the supercapacitor according to the configured size of the available capacity value of the Cache.

If the available capacity value of the Cache increases, the working voltage of the supercapacitor is increased; if the available capacity value of the Cache decreases, the working voltage of the supercapacitor is decreased.

It may be understood that, step S503 may specifically include:

Step 1: According to a capacity of the supercapacitor, a discharging cutoff voltage of the supercapacitor, discharging efficiency, a circuit power, and data write bandwidth, calculate a correspondence between a size of an available capacity value of the Cache and a working voltage of the supercapacitor.

Step 2: According to the configured size of the available capacity value of the Cache, and the correspondence between a size of an available capacity value of the Cache and a working voltage of the supercapacitor, adjust the working voltage of the supercapacitor to a voltage value corresponding to the size of the available capacity value of the Cache.

It may be understood that, a relationship between a size of an available capacity value of the Cache and a working voltage of the supercapacitor may be determined with reference to FIG. 4 and related description in the foregoing embodiments, which is not described in detail herein.

A voltage adjusting range of the supercapacitor is 0 V-$U_1$, where $U_1$ is a voltage value of a corresponding write Cache when a service volume is maximum. According to the configured size of the available capacity value of the Cache in step S502 and the correspondence that is between a size of an available capacity value of the Cache and a working voltage of the supercapacitor and obtained in step 1, a current working voltage of the supercapacitor is adjusted to a voltage value corresponding to the configured size of the available capacity value of the Cache. If the available capacity value of the Cache increases, the working voltage of the supercapacitor is increased; if the available capacity value of the Cache decreases, the working voltage of the supercapacitor is decreased.

Further, preferably, the method further include: within a power failure protection time that can be supported by an adjusted working voltage of the supercapacitor, enabling data in the Cache whose available capacity value has been adjusted to be migrated into another non-volatile storage medium, where a migrating operation is the same as that in prior art and may be completed by a CPU. It may be understood that, if a size of a capacity of the Cache is not adjusted, data cannot be completely migrated, causing a data loss; therefore, the method provided in the present invention can ensure that data in the Cache is migrated into a non-volatile medium within a power failure time.

It can be learned from the foregoing description that, in the method for adjusting a voltage of a supercapacitor provided in this embodiment of the present invention, a size of an available capacity value of a Cache is configured according to the time information of the system service, thereby implementing intelligent adjustment of a working voltage of the supercapacitor, retarding aging of the supercapacitor, effectively increasing a service life of the supercapacitor, and improving product competitiveness.

To more conveniently and better implement the method for adjusting a voltage of a supercapacitor provided in this embodiment of the present invention, an embodiment of the present invention further provides an apparatus that is based on the foregoing method for adjusting a voltage. A meaning of a name is the same as that in the foregoing method for adjusting a voltage of a supercapacitor, and for specific implementation details, reference may be made to descriptions in the method embodiments.

Figure 6:
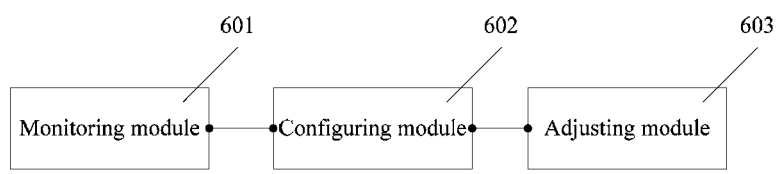
FIG. 6 is a schematic structural diagram of an apparatus for adjusting a voltage of a supercapacitor according to an embodiment of the present invention.

Referring to FIG. 6, FIG. 6 is a schematic structural diagram of an apparatus for adjusting a voltage of a supercapacitor according to an embodiment of the present invention. The supercapacitor is used to perform power failure protection on a control chip that executes a service, where the control chip includes a Cache. The apparatus for adjusting a voltage may include:

a monitoring module 601, configured to acquire information that carries a system service volume;

a configuring module 602, configured to configure a size of an available capacity value of the Cache according to the information; and an adjusting module 603, configured to adjust a working voltage of the supercapacitor according to the configured size of the available capacity value of the Cache.

Further referring to FIG. 2b, $1_1$ is a corresponding discharging capability curve when the working voltage of the supercapacitor is fixed at a voltage value $U_1$; $U_1$ needs to last a power failure protection time when a service volume is maximum; a time point A is an original service life termination point of the supercapacitor; $1_2$ is a corresponding discharging capability curve when the supercapacitor works at an intelligently adjusted working voltage; and a time point B is a corresponding service life termination point of the supercapacitor whose working voltage has been intelligently adjusted, where the time point B is later than the time point A. It may be learned from FIG. 3 that after the working voltage of the supercapacitor is intelligently adjusted according to a current service situation, the service life of the supercapacitor is obviously longer than its original service life.

It can be learned from the foregoing description that, in the apparatus for adjusting a voltage of a supercapacitor provided in this embodiment of the present invention, according to an actual situation of a current system service, a size of an available capacity value of a Cache is configured, thereby implementing intelligent adjustment of a working voltage of the supercapacitor, retarding aging of the supercapacitor, to effectively increase a service life of the supercapacitor, and improving product competitiveness.

Preferably, the apparatus for adjusting a voltage of a supercapacitor provided in this embodiment of the present invention may be applied to power failure protection on a RAID/SSD card, effectively increasing the service life of the supercapacitor; when a primary power supply fails, the supercapacitor may serve as a backup battery to supply backup power, and save data in the Cache into a Nand Flash or another storage medium on which data loss does not occur in the case of power failure. It may be understood that, the apparatus for adjusting a voltage of a supercapacitor may also be used in another case in which a supercapacitor is used for power failure protection, which is not specifically limited herein.

Preferably, in some embodiments of the present invention, the information that carries a system service volume is information about an effective traffic volume of a system interface.

The configuring module 602 is configured to: when the effective traffic volume increases, configure the available capacity value of the Cache to a larger value; when the effective traffic volume decreases, configure the available capacity value of the Cache to a smaller value.

Further, the configuring module 602 may be specifically configured to: when it is determined that the effective traffic volume of the system interface meets a preset traffic volume range within a preset time period, according to a correspondence between a preset traffic volume range and a size of an available capacity value of the Cache, configure a size of an available capacity value of the Cache within a next preset time period to a capacity value corresponding to the preset traffic volume range.

Based on the foregoing description, when the information that carries a system service volume is information about an effective traffic volume of a system interface, the apparatus for adjusting a voltage may further include an acquiring module, where the acquiring module is configured to acquire the effective traffic volume of the system interface; specifically, for a disk array RAID, the acquiring module is specifically configured to acquire an effective traffic volume of a PCIE interface; for a solid state disk SSD, the acquiring module is specifically configured to acquire an effective traffic volume of a PCIE interface or a SAS/SATA interface.

Further, the configuring module 602 is configured to: if it is determined that the effective traffic volume of the PCIE interface or the effective traffic volume of the SAS/SATA interface meets a preset traffic volume range within a preset time period, according to a correspondence between a preset traffic volume range and a size of an available capacity value of the Cache and according to a size of the preset traffic volume range, configure a size of an available capacity value of the Cache within a next preset time period to a capacity value corresponding to the preset traffic volume range. If the effective traffic volume of the system interface increases, the available capacity value of the Cache is increased; if the effective traffic volume of the system interface decreases, the available capacity value of the Cache is decreased.

Further referring to FIG. 3b, the preset time period is t, and the configuring module 602 configures, according to the correspondence between a preset traffic volume range and a size of an available capacity value of the Cache, a size of an available capacity value of the Cache within a next preset time period t to a capacity value corresponding to the preset traffic volume range. It may be understood that, when it is determined that an average value of effective traffic volumes within the preset time period t falls within a preset traffic volume range, a size of an available capacity value of the Cache within a next preset time period t is adjusted, that is, according to a size of an effective traffic volume of the system interface within a previous preset time period t, a size of a currently available capacity value of the Cache is adjusted, where an adjusted size of the currently available capacity value of the Cache corresponds to the preset traffic volume range.

It may be understood that, the correspondence between a preset traffic volume range and a size of an available capacity value of the Cache may be preset in a system. In addition, in this embodiment of the present invention, information about correspondence between a preset traffic volume range and a configured size of an available capacity value of the Cache may be further recorded by using an Extensible Markup Language XML configuration file, which is not specifically limited herein.

Preferably, in some embodiments of the present invention, if the information that carries a system service volume is time information of a system service, the configuring module 602 is specifically configured to, according to the time information of the system service, and a correspondence between time information of a system service and a size of an available capacity value of the Cache, configure a size of a currently available capacity value of the Cache to a capacity value corresponding to the time information of the system service.

Further, referring to FIG. 5b together, the configuring module 602 configures the size of an available capacity value of the Cache according to currently acquired time information and the preset correspondence between time information of a system service and a size of an available capacity value of the Cache. For example, as shown in FIG. 5b, in this embodiment, the time information of the system service in one day is divided into four pieces of time period information, such as one time period from 00:00 to 6:00, one time period from 6:00 to 12:00, one time period from 12:00 to 18:00, and one time period from 18:00 to 24:00, and each time period corresponds to a configured size of the available capacity value of the Cache. According to determined current time period information, a size of a currently available capacity value of the Cache is configured to a capacity value corresponding to the current time period information.

It may be understood that, the correspondence between time information of a system service and a size of an available capacity value of the Cache may be preset in a system. In addition, in this embodiment of the present invention, information about correspondence between time information of a system service and a configured size of an available capacity value of the Cache may be further recorded by using an Extensible Markup Language XML configuration file, which is not specifically limited herein.

In addition, it is easy to figure out that the time period information listed in this embodiment is only exemplary description, and does not impose a limitation on the present invention. In some cases with higher requirements, the time information of the system service in one day may be divided into information of more time periods, such as 6 or 8 time periods, which is not specifically limited herein.

Further, preferably, based on a size that is of the available capacity value of the Cache and configured by the configuring module 602, the adjusting module 603 is configured to: if the available capacity value of the Cache increases, increase the working voltage of the supercapacitor; if the available capacity value of the Cache decreases, decrease the working voltage of the supercapacitor.

Further, the adjusting module 603 may be specifically configured to:
  according to a capacity of the supercapacitor, a discharging cutoff voltage of the supercapacitor, discharging efficiency, a circuit power, and data write bandwidth, calculate a correspondence between a size of an available capacity value of the Cache and a working voltage of the supercapacitor; and according to the configured size of the available capacity value of the Cache, and the correspondence between a size of an available capacity value of the Cache and a working voltage of the supercapacitor, adjust the working voltage of the supercapacitor to a voltage value corresponding to the size of the available capacity value of the Cache, where: if the available capacity value of the Cache increases, the working voltage of the supercapacitor is increased; if the available capacity value of the Cache decreases, the working voltage of the supercapacitor is decreased.

For the relationship between a size of an available capacity value of the Cache and a working voltage of the supercapacitor, reference may be made to a schematic comparison shown in FIG. 4. It is assumed that the capacity of the supercapacitor is C, the discharging cutoff voltage of the supercapacitor is $U_1$, the discharging efficiency of the supercapacitor is K, the circuit power is P, and the data write bandwidth is B, where the circuit power P is a power of a circuit after a power supply of the system fails and when the supercapacitor performs discharging. The relationship between an available capacity value V of the Cache and a working voltage $U_2$ of the supercapacitor (that is, a charging voltage of the supercapacitor) may be deduced from the following data formulas: because $0.5*C*(U_2^2-U_1^2)*K=Pt$, it can be deduced that a discharging time of the supercapacitor is $t=0.5*C*(U_2^2-U_1^2)*K/P$, then the relationship between an available capacity value V of the Cache and a working voltage $U_2$ of the supercapacitor is $V=Bt=B*0.5*C*(U_2^2-U_1^2)*K/P$. Then, the adjusting module 603 adjusts, according to a size that is of the available capacity value of the Cache and configured by the configuring module 602, and the correspondence between a size of an available capacity value of the Cache and a working voltage of the supercapacitor, a current working voltage of the supercapacitor to a voltage value corresponding to the configured size of the available capacity value of the Cache.

Further, preferably, the apparatus further includes a control module, where the control module is configured to, within a power failure protection time that can be supported by an adjusted working voltage of the supercapacitor, enable data in the Cache whose available capacity value has been adjusted to be migrated into another non-volatile storage medium. It may be understood that, if a size of a capacity of the Cache is not adjusted, data cannot be completely migrated, causing a data loss; therefore, the control module described in the present invention can ensure that data in the Cache is migrated into a non-volatile medium within a power failure time.

It can be learned from the foregoing description that, in the apparatus for adjusting a voltage of a supercapacitor provided in this embodiment of the present invention, determining is performed on a service condition according to a current service condition that includes an effective traffic volume of a system interface and time information of a system service, and a size of an available capacity value of a Cache is configured according to a result of the determining, thereby implementing intelligent adjustment of a working voltage of the supercapacitor, retarding aging of the supercapacitor, effectively increasing a service life of the supercapacitor, and improving product competitiveness.

Figure 7:
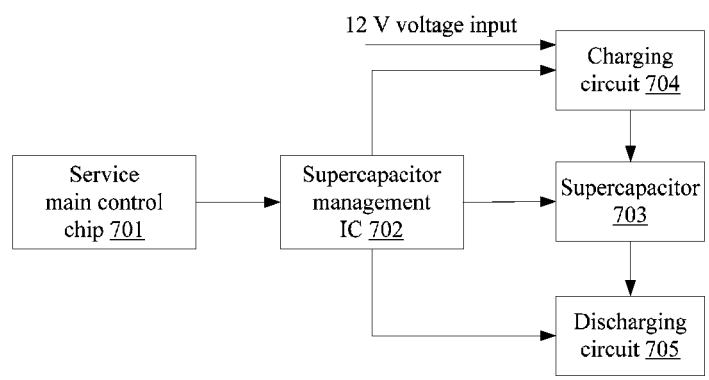
FIG. 7 is a schematic structural diagram of a system for adjusting a voltage of a supercapacitor according to an embodiment of the present invention.

Preferably, the present invention further provides a system for adjusting a voltage of a supercapacitor. Referring to FIG. 7, FIG. 7 is a schematic structural diagram of the system for adjusting a voltage of a supercapacitor according to the present invention. The system includes a service main control chip 701 (that is, such as a RAID or SSD controller), a supercapacitor management IC 702, and a supercapacitor 703.

The supercapacitor 703 is used to perform power failure protection on the service main control chip 701 that executes a service, where the service main control chip 701 includes a Cache.

The supercapacitor management IC 702 is configured to: acquire information that carries a system service volume, configure a size of an available capacity value of the Cache according to the information, and adjust a working voltage of the supercapacitor 703 according to the configured size of the available capacity value of the Cache.

Further, the system further includes: a charging circuit 704 and a discharging circuit 705. When a primary power supply fails (that is, a 12 V voltage input of a system is disconnected), the service main control chip 701 sends a message to the supercapacitor management IC 702, and the supercapacitor management IC 702 outputs a control signal that controls the supercapacitor 703 to perform charging or discharging. It should be understood that, in some embodiments of the present invention, the service main control chip 701 may be integrated with the supercapacitor management IC 702 and directly controls the supercapacitor.

The system for adjusting a voltage of a supercapacitor provided in this embodiment of the present invention may be applied to power failure protection on a RAID/SSD card, effectively increasing a service life of the supercapacitor; when a primary power supply fails, the supercapacitor may serve as a backup battery to supply backup power, and save data in the Cache into a Nand Flash or another storage medium on which data loss does not occur in the case of power failure. It may be understood that, the system for adjusting a voltage of a supercapacitor may also be used in another case in which a supercapacitor is used for power failure protection, which is not specifically limited herein.

Preferably, in some embodiments of the present invention, the information that carries a system service volume is information about an effective traffic volume of a system interface; the supercapacitor management IC 702 is configured to: when the effective traffic volume increases, configure the available capacity value of the Cache to a larger value; and when the effective traffic volume decreases, configure the available capacity value of the Cache to a smaller value.

Further, that the supercapacitor management IC 702 is specifically configured to configure a size of an available capacity value of the Cache according to the information includes: when it is determined that the effective traffic volume of the system interface meets a preset traffic volume range within a preset time period, according to a correspondence between a preset traffic volume range and a size of an available capacity value of the Cache, configuring a size of an available capacity value of the Cache within a next preset time period to a capacity value corresponding to the preset traffic volume range.

In this implementation manner, the supercapacitor management IC 702 is further configured to acquire the effective traffic volume of the system interface.

If the service main control chip 701 is used to execute a disk array RAID service, the service main control chip is a RAID controller and the system interface is a PCIE interface, the acquiring the effective traffic volume of the system interface is acquiring an effective traffic volume of the PCIE interface.

If the service main control chip 701 is used to execute a solid state disk SSD service, the control chip is an SSD controller and the system interface is a PCIE interface or a SAS/SATA interface, the acquiring the effective traffic volume of the system interface is acquiring an effective traffic volume of the PCIE interface or the SAS/SATA interface.

Preferably, in some embodiments of the present invention, the information that carries a system service volume is time information of a system service; and that the supercapacitor management IC 702 is configured to configure a size of an available capacity value of the Cache according to the information includes: according to the time information of the system service, and a preset correspondence between time information of a system service and a size of an available capacity value of the Cache, configuring a size of a currently available capacity value of the Cache to a capacity value corresponding to the time information of the system service.

According to currently acquired time information, and the preset correspondence between time information of a system service and a size of an available capacity value of the Cache, the size of an available capacity value of the Cache is configured. For example, as shown in FIG. 5b, in this embodiment, time information of the system service in one day is divided into four pieces of time period information, such as one time period from 00:00 to 6:00, one time period from 6:00 to 12:00, one time period from 12:00 to 18:00, and one time period from 18:00 to 24:00, and each time period corresponds to a configured size of the available capacity value of the Cache. According to determined current time period information, a size of a currently available capacity value of the Cache is configured to a capacity value corresponding to the current time period information.

It is easy to figure out that the time period information listed in this embodiment is only exemplary description, and does not impose a limitation on the present invention. In some cases with higher requirements, the time information of the system service in one day may be divided into information of more time periods, such as 6 or 8 time periods, which is not specifically limited herein.

Based on a size that is of the available capacity value of the Cache and configured by the supercapacitor management IC 702, the supercapacitor management IC 702 may be further configured to: if the available capacity value of the Cache increases, increase the working voltage of the supercapacitor; and if the available capacity value of the Cache decreases, decrease the working voltage of the supercapacitor.

Further, the supercapacitor management IC 702 may be specifically configured to: according to a capacity of the supercapacitor, a discharging cutoff voltage of the supercapacitor, discharging efficiency, a circuit power, and data write bandwidth, calculate a correspondence between a size of an available capacity value of the Cache and a working voltage of the supercapacitor; and according to a configured size of the available capacity value of the Cache, and the correspondence between a size of an available capacity value of the Cache and a working voltage of the supercapacitor, adjust the working voltage of the supercapacitor to a voltage value corresponding to the size of the available capacity value of the Cache, where: if the available capacity value of the Cache increases, the working voltage of the supercapacitor is increased; if the available capacity value of the Cache decreases, the working voltage of the supercapacitor is decreased.

Further, preferably, the supercapacitor management IC 702 is further configured to, within a power failure protection time that can be supported by an adjusted working voltage of the supercapacitor, enable data in the Cache whose available capacity value has been adjusted to be migrated into another non-volatile storage medium. It may be understood that, if a size of a capacity of the Cache is not adjusted, data cannot be completely migrated, causing a data loss; therefore, the supercapacitor management IC 702 described in the present invention can ensure that data in the Cache is migrated into a non-volatile medium within a power failure time.

In the foregoing embodiments, description of each embodiment has respective focuses. For a part that is not described in detail in an embodiment, reference may be made to related descriptions in other embodiments.

It can be learned from the foregoing description that, in the system for adjusting a voltage of a supercapacitor provided in this embodiment of the present invention, determining is performed on a service condition according to a current service condition that includes an effective traffic volume of a system interface and time information of a system service, and a size of an available capacity value of a Cache is configured according to a result of the determining, thereby implementing intelligent adjustment of a working voltage of the supercapacitor, retarding aging of the supercapacitor, effectively increasing a service life of the supercapacitor, and improving product competitiveness.

Figure 8:
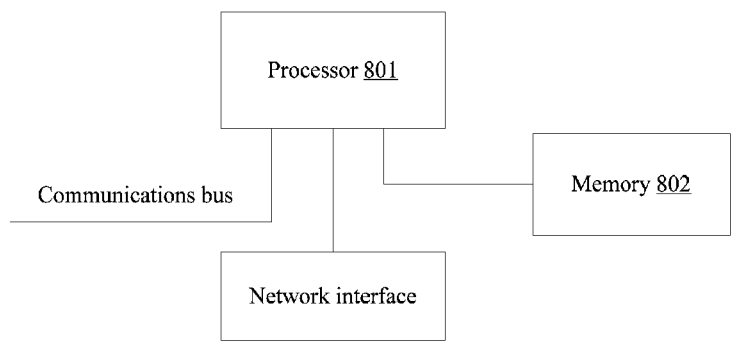
FIG. 8 is another schematic structural diagram of an apparatus for adjusting a voltage of a supercapacitor according to an embodiment of the present invention.

Referring to FIG. 8, FIG. 8 is another schematic structural diagram of an apparatus for adjusting a voltage of a supercapacitor according to an embodiment of the present invention. The apparatus may include at least one processor 801 (for example, a CPU, Central Processing Unit), at least one network interface or another communications interface, a memory 802, and at least one communications bus that is used to implement connection and communication between these components. The processor 801 is configured to execute an executable module such as a computer program that is stored in the memory. The memory 802 may include a high-speed random access memory (RAM, Random Access Memory) and may further include a non-volatile memory (non-volatile memory), such as at least one magnetic disk memory. Through at least one network interface (which may be wired or wireless), a communication connection between a system gateway and at least one of other network elements is implemented by using the Internet, a wide area network, a local area network, a metropolitan area network, and the like.

As shown in FIG. 5, in some implementation manners, the memory 802 stores a program instruction and the program instruction can be executed by the processor 801, where the supercapacitor is used to perform power failure protection on a control chip that executes a service and the control chip includes a Cache. The processor 801 specifically executes the following steps:

acquiring information that carries a system service volume; configuring a size of an available capacity value of the Cache according to the information; and adjusting a working voltage of the supercapacitor according to the configured size of the available capacity value of the Cache.

Preferably, if the information that carries a system service volume is information about an effective traffic volume of a system interface, that the processor 801 is configured to configure a size of an available capacity value of the Cache according to the information includes: when the effective traffic volume increases, configuring the available capacity value of the Cache to a larger value; and when the effective traffic volume decreases, configuring the available capacity value of the Cache to a smaller value.

Further, when it is determined that the effective traffic volume of the system interface meets a preset traffic volume range within a preset time period, according to a correspondence between a preset traffic volume range and a size of an available capacity value of the Cache, a size of an available capacity value of the Cache within a next preset time period is configured to a capacity value corresponding to the preset traffic volume range.

In this implementation manner, the processor 801 is further configured to acquire the effective traffic volume of the system interface.

If the control chip is used to execute a disk array RAID service, the control chip is a RAID controller and the system interface is a PCIE interface, that the processor 801 is configured to acquire the effective traffic volume of the system interface is acquiring an effective traffic volume of the PCIE interface.

If the control chip is used to execute a solid state disk SSD service, the control chip is an SSD controller and the system interface is a PCIE interface or a SAS/SATA interface, that the processor 801 is configured to acquire the effective traffic volume of the system interface is acquiring an effective traffic volume of the PCIE interface or the SAS/SATA interface.

Preferably, the information that carries a system service volume is time information of a system service.

That the processor 801 is configured to configure a size of an available capacity value of the Cache according to the information includes: according to the time information of the system service, and a preset correspondence between time information of a system service and a size of an available capacity value of the Cache, configuring a size of a currently available capacity value of the Cache to a capacity value corresponding to the time information of the system service.

Preferably, that the processor 801 is configured to adjust a working voltage of the supercapacitor according to the configured size of the available capacity value of the Cache includes: if the available capacity value of the Cache increases, increasing the working voltage of the supercapacitor; and if the available capacity value of the Cache decreases, decreasing the working voltage of the supercapacitor.

Further, preferably, the processor 801 may be further configured to, within a power failure protection time that can be supported by an adjusted working voltage of the supercapacitor, enable data in the Cache whose available capacity value has been adjusted to be migrated into another non-volatile storage medium. It may be understood that, if a size of a capacity of the Cache is not adjusted, data cannot be completely migrated, causing a data loss; therefore, the method provided in the present invention can ensure that data in the Cache is migrated into a non-volatile medium within a power failure time.

It can be learned from the foregoing description that, in the apparatus for adjusting a voltage of a supercapacitor provided in this embodiment of the present invention, determining is performed on a service condition according to a current service condition that includes an effective traffic volume of a system interface and time information of a system service, and a size of an available capacity value of a Cache is configured according to a result of the determining, thereby implementing intelligent adjustment of a working voltage of the supercapacitor, retarding aging of the supercapacitor, effectively increasing a service life of the supercapacitor, and improving product competitiveness.

In the foregoing embodiments, description of each embodiment has respective focuses. For a part that is not described in detail in an embodiment, reference may be made to related descriptions in other embodiments.

It may be clearly understood by a person skilled in the art that, for ease and brevity of description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual requirements to achieve the purposes of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The method, apparatus, and system for adjusting a voltage of a supercapacitor that are provided by the present invention have been introduced in detail in the foregoing, and a person of ordinary skill in the art can make variations to specific implementation manners and the application scope without departing from the spirit of the embodiments of the present invention. In conclusion, content of this specification should not be understood as a limitation on the present invention.

What is claimed is:

1. A method for adjusting a voltage of a supercapacitor, wherein the supercapacitor is used to perform power failure protection on a control chip that executes a service, wherein the control chip comprises a Cache, wherein the method comprises:

acquiring information that carries a system service volume, wherein the information that carries a system service volume includes information about an effective traffic volume of a system interface;
configuring a size of an available capacity value of the Cache according to the information, by configuring the available capacity value of the Cache to a larger value in response to an increase in the effective traffic volume, and configuring the available capacity value of the Cache to a smaller value in response to a decrease in the effective traffic volume; and
adjusting a working voltage of the supercapacitor according to the configured size of the available capacity value of the Cache, wherein adjusting includes:
increasing the working voltage of the supercapacitor in response to an increase in the available capacity value of the Cache; and decreasing the working voltage of the supercapacitor in response to a decrease in the available capacity value of the Cache; and
wherein the control chip is a Redundant Array of Independent Disks (RAID) controller that executes a RAID service and the system interface is a PCIE interface, and the acquiring the effective traffic volume of the system interface includes acquiring an effective traffic volume of the PCIE interface, or
wherein the control chip is an SSD controller and the system interface is a PCIE interface or a SAS/SATA interface, and the acquiring the effective traffic volume of the system interface includes acquiring an effective traffic volume of the PCIE interface or the SAS/SATA interface.

2. The method according to claim 1, wherein the information that carries a system service volume further includes time information of a system service, wherein the time information corresponds to the system service volume; and
the configuring a size of an available capacity value of the Cache according to the information further comprises:
according to the time information of the system service, and a preset correspondence between the time information of a system service and the size of an available capacity value of the Cache, configuring a current size of the available capacity value of the Cache to a capacity value corresponding to the time information of the system service.

3. The method according to claim 1, further comprising, within a power failure protection time that can be supported by an adjusted working voltage of the supercapacitor, migrating into another non-volatile storage medium data in the Cache whose available capacity value has been adjusted.

4. An apparatus for adjusting a voltage of a supercapacitor, wherein the supercapacitor is used to perform power failure protection on a control chip that executes a service, wherein the control chip comprises a Cache, wherein the apparatus comprises:
a monitoring module, configured to acquire information that carries a system service volume, wherein the information that carries a system service volume includes information about an effective traffic volume of a system interface;
a configuring module, configured to configure a size of an available capacity value of the Cache according to the information, by configuring the available capacity value of the Cache to a larger value in response to an increase in the effective traffic volume, and configuring the available capacity value of the Cache to a smaller value in response to a decrease in the effective traffic volume; and an adjusting module, configured to adjust a working voltage of the supercapacitor according to the configured size of the available capacity value of the Cache, wherein the adjusting module is configured to adjust the working voltage of the supercapacitor by:
increasing the working voltage of the supercapacitor in response to an increase in the available capacity value of the Cache; and decreasing the working voltage of the supercapacitor in response to a decrease in the available capacity value of the Cache; and
wherein the control chip is a Redundant Array of Independent Disks (RAID) controller that executes a RAID service and the system interface is a PCIE interface, and the acquiring the effective traffic volume of the system interface includes acquiring an effective traffic volume of the PCIE interface, or
wherein the control chip is an SSD controller and the system interface is a PCIE interface or a SAS/SATA interface, and the acquiring the effective traffic volume of the system interface includes acquiring an effective traffic volume of the PCIE interface or the SAS/SATA interface.

5. The apparatus according to claim 4, wherein the information that carries a system service volume further includes time information of a system service, wherein the time information corresponds to the system service volume; and
the configuring module is further configured to, according to the time information of the system service, and a preset correspondence between the time information of a system service and the size of an available capacity value of the Cache, configure the current size of the available capacity value of the Cache to a capacity value corresponding to the time information of the system service.

6. The apparatus according to claim 4, wherein the apparatus further comprises a control module, wherein the control module is configured to, within a power failure protection time that can be supported by an adjusted working voltage of the supercapacitor, enable migrating into another non-volatile storage medium of data in the Cache whose available capacity value has been adjusted.

7. A system for adjusting a voltage of a supercapacitor, wherein the system comprises a service main control chip, a supercapacitor management IC, and the supercapacitor; wherein:
the supercapacitor is used to perform power failure protection on the service main control chip that executes a service, wherein the service main control chip comprises a Cache; and
the supercapacitor management IC is configured to:
acquire information that carries a system service volume wherein the information that carries a system service volume includes information about an effective traffic volume of a system interface;
configure a size of an available capacity value of the Cache according to the information, by configuring the available capacity value of the Cache to a larger value in response to an increase in the effective traffic volume, and configuring the available capacity value of the Cache to a smaller value in response to a decrease in the effective traffic volume; and
adjust a working voltage of the supercapacitor according to the configured size of the available capacity value of the Cache, by increasing the working voltage of the supercapacitor in response to an increase in the available capacity value of the Cache; and decreasing the working voltage of the supercapacitor in response to a decrease in the available capacity value of the Cache; and wherein the service main control chip is a Redundant Array of Independent Disks (RAID) controller that executes a RAID service and the system interface is a PCIE interface, and the acquiring the effective traffic volume of the system interface includes acquiring an effective traffic volume of the PCIE interface.

8. The system according to claim 7, wherein the information that carries a system service volume further includes time information of a system service, wherein the time information corresponds to the system service volume; and that the supercapacitor management IC is configured to configure a size of an available capacity value of the Cache according to the information further comprises: according to the time information of the system service, and a preset correspondence between the time information of a system service and the size of an available capacity value of the Cache, configuring a current size of the available capacity value of the Cache to a capacity value corresponding to the time information of the system service.

9. The system according to claim 7, wherein, within a power failure protection time that can be supported by an adjusted working voltage of the supercapacitor, data in the Cache whose available capacity value has been adjusted is migrated into another non-volatile storage medium.

10. A system for adjusting a voltage of a supercapacitor, wherein the system comprises a service main control chip, a supercapacitor management IC, and the supercapacitor; wherein:

the supercapacitor is used to perform power failure protection on the service main control chip that executes a service, wherein the service main control chip comprises a Cache; and the supercapacitor management IC is configured to:
acquire information that carries a system service volume, wherein the information that carries a system service volume is information about an effective traffic volume of a system interface;

configure a size of an available capacity value of the Cache according to the information, by configuring the available capacity value of the Cache to a larger value in response to an increase in the effective traffic volume, and configuring the available capacity value of the Cache to a smaller value in response to a decrease in the effective traffic volume; and adjust a working voltage of the supercapacitor according to the configured size of the available capacity value of the Cache, by increasing the working voltage of the supercapacitor in response to an increase in the available capacity value of the Cache; and decreasing the working voltage of the supercapacitor in response to a decrease in the available capacity value of the Cache wherein the service main control chip is an SSD controller and the system interface is a PCIE interface or a SAS/SATA interface, and the acquiring the effective traffic volume of the system interface includes acquiring an effective traffic volume of the PCIE interface or the SAS/SATA interface.

* * * * *